(12) United States Patent
Moulinet

(10) Patent No.: US 6,168,529 B1
(45) Date of Patent: Jan. 2, 2001

(54) CROSS-PIECE FOR UNIVERSAL JOINT AND UNIVERSAL JOINT

(75) Inventor: Francois Moulinet, Triel sur Seine (FR)

(73) Assignee: GKN Automotive AG, Lohmar (DE)

( * ) Notice: Under 35 U.S.C. 154(b), the term of this patent shall be extended for 0 days.

(21) Appl. No.: 09/155,987

(22) PCT Filed: Mar. 6, 1997

(86) PCT No.: PCT/FR97/00402

§ 371 Date: Feb. 10, 1999

§ 102(e) Date: Feb. 10, 1999

(87) PCT Pub. No.: WO97/38232

PCT Pub. Date: Oct. 16, 1997

(30) Foreign Application Priority Data

Apr. 10, 1996 (FR) .................................................. 96 04474

(51) Int. Cl.[7] .................................................. F16D 3/205
(52) U.S. Cl. .................................................. 464/133; 484/905
(58) Field of Search .................................................. 464/111, 112, 464/114, 132, 133, 905

(56) References Cited

U.S. PATENT DOCUMENTS

| | | | |
|---|---|---|---|
| 4,224,806 | * | 9/1980 | Kobayashi .......................... 464/905 |
| 4,689,035 | * | 8/1987 | Orain .................................. 464/124 |
| 4,810,232 | * | 3/1989 | Farrell et al. ....................... 464/111 |
| 5,069,653 | * | 12/1991 | Mizukoshi ........................... 464/111 |
| 5,098,342 | * | 3/1992 | Mizukoshi ........................... 464/111 |
| 5,376,050 | * | 12/1994 | Krude et al. ....................... 464/111 |

FOREIGN PATENT DOCUMENTS

| | | |
|---|---|---|
| 43 31 474 | 3/1995 | (DE) . |
| 2 079 747 | 11/1971 | (FR) . |
| 2 198 576 | 3/1974 | (FR) . |
| 2 438 763 | 5/1980 | (FR) . |

* cited by examiner

*Primary Examiner*—B. Dayoan
*Assistant Examiner*—Kenneth Thompson
(74) *Attorney, Agent, or Firm*—Wenderoth, Lind & Ponack, L.L.P.

(57) ABSTRACT

This spider for a universal joint includes a central body (2) intended to be connected to a shaft and from which several arms (3) project, a roller (5) mounted so that it can roll and slide on each arm (3) by means of a ring of needles (4), and a member (8) for retaining each roller (5) on its arm (3). The arm (3) includes a hollowed peripheral raceway (12) in which the needles (4) run. The retaining member includes a collar (8) mounted at the end of the arm and spaced away from the needles (4), which collar has, on the outside, over at least most of its periphery, a rim (18) for positive retention of the roller.

22 Claims, 1 Drawing Sheet

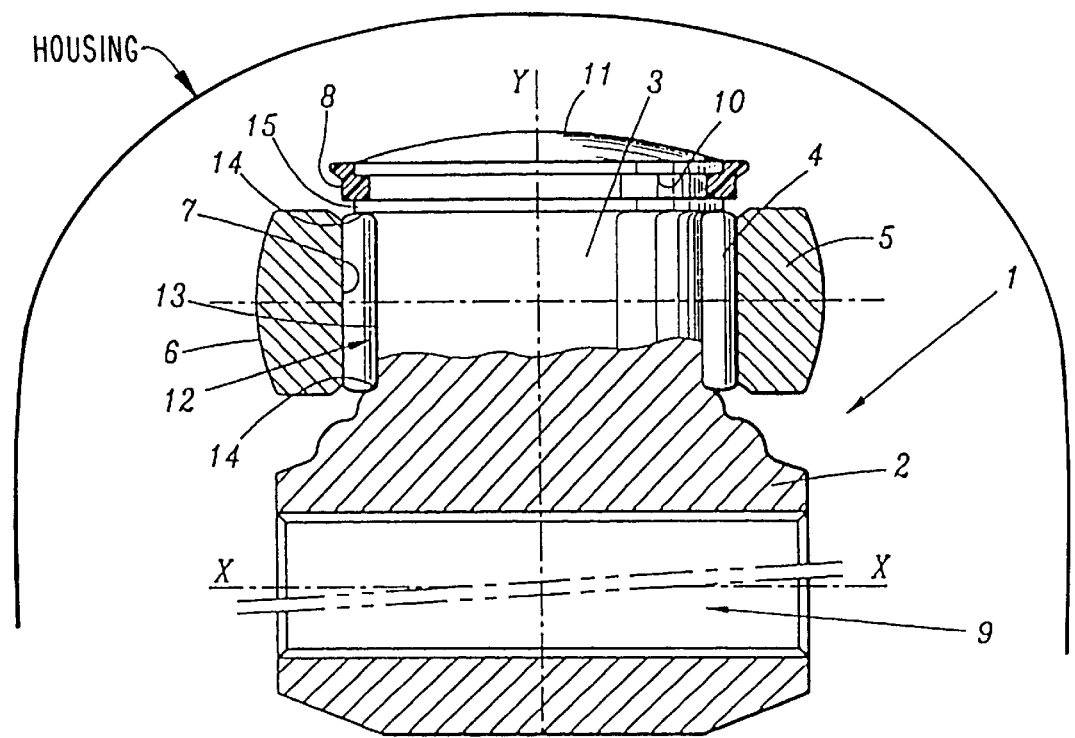
FIG. 1
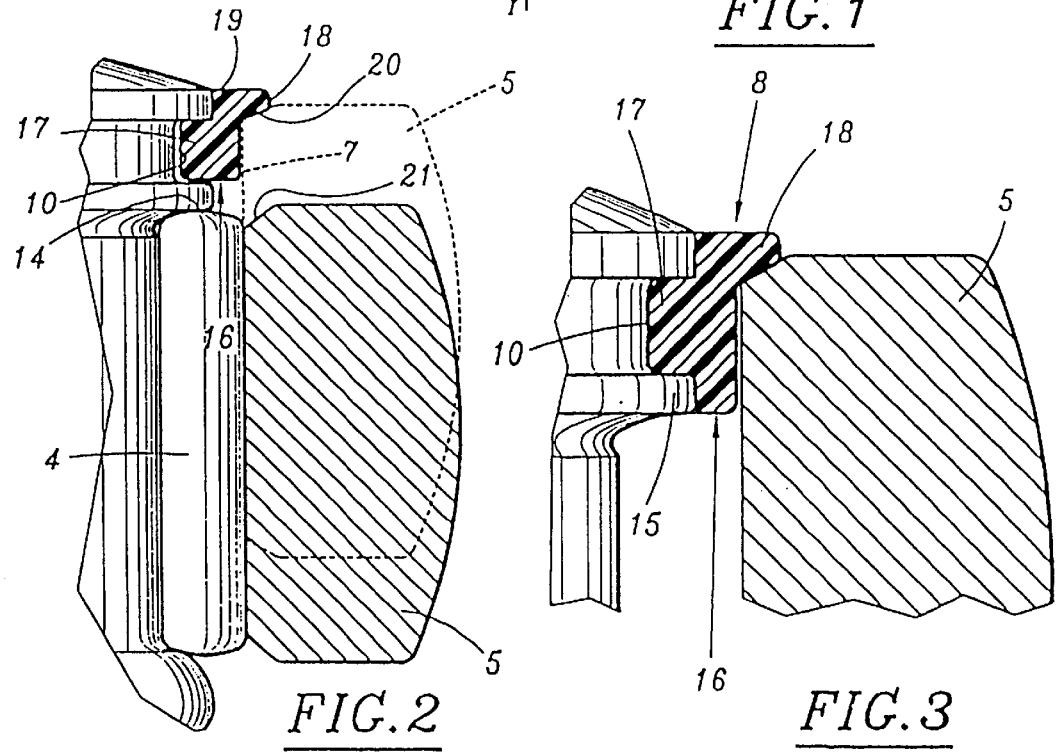
FIG. 2
FIG. 3

CROSS-PIECE FOR UNIVERSAL JOINT AND UNIVERSAL JOINT

BACKGROUND OF THE INVENTION

The present invention relates to a spider for a universal joint, of the type comprising a central body intended to be connected to a shaft and from which several arms project, a roller mounted so that it can roll and slide on each arm by means of a ring of needle bearings, and a member for retaining each roller on its arm.

In universal joints comprising a spider of this type, for example constant-velocity joints of the tripod type used in motor vehicle transmissions, the rollers are, after assembling the joint, held captive in pistons of a female element or housing of this joint. Consequently, if the joint is delivered assembled, the rollers cannot escape from their arms.

However, in some cases it is necessary for the spider fitted with rollers and needles on the one hand, and the female element on the other hand to be delivered separately, assembly taking place on a vehicle assembly line. It is therefore necessary to provide means for retaining each roller on its arm.

SUMMARY OF THE INVENTION

The object of the invention is to provide particularly economical and effective retaining means which can be left in place after assembling the joint, without them impairing the proper operation of the joint.

For this purpose, the subject of the invention is a spider of the aforementioned type, characterized in that the arm includes a hollowed peripheral raceway in which the needle bearings rotate, the retaining member including a collar mounted at the end of the arm and spaced away from the needles, which collar has, on the outside, over at least most of its periphery, a rim for positive retention of the roller.

The spider may according to the invention include one or more of the following characteristics:
 the collar is engaged partly in a groove made substantially at the end of the arm and spaced away from the hollowed raceway;
 the retaining rim lies at the outside end of the collar, which collar has a running outside diameter less than the diameter of the bore of the roller;
 the collar includes, on the inside, a peripheral excrescence engaged in the said groove, which excrescence is axially offset with respect to the said retaining rim;
 the excrescence is made in the intermediate part of the collar;
 the collar is annular and made of a springy material, in particular a springy plastic;
 the collar is springy and split, and is in particular a split metal ring.

The subject of the invention is also a universal joint comprising a spider, as defined hereinabove, and a female element which includes tracks in which the rollers are engaged.

BRIEF DESCRIPTION OF THE DRAWINGS

The invention will be more clearly understood on reading the description which follows, given solely by way of example and with reference to the drawings in which:

FIG. 1 is a partial sectional view of a spider in accordance with the invention;

FIG. 2 is a view on a larger scale of a detail of Figure 1 showing the excursion of the sliding roller; and FIG. 3 is a partial sectional view showing an alternative embodiment of the retaining collar involved in the composition of the spider according to the invention.

DETAILED DESCRIPTION OF THE PREFERRED EMBODIMENTS

FIG. 1 shows a constant-velocity universal joint spider 1 of the tripod type. This spider consists of an annular central body 2 of axis X—X from which three arms 3 of axis Y—Y project radially, these arms being arranged angularly at 120° with each other, and on each arm 3 is provided a ring of needle bearings 4, a roller 5 having a spherical outside surface 6 and a cylindrical bore 7, and a collar 8 for positive retention of the roller on its arm.

The central bore 9 of the body 2 is keyed in order to mount it on a drive shaft, not shown. Each arm 3 has, close to its free end, a circular groove 10 of axis Y—Y which separates the main or running part of the arm from an end cap 11 made as one piece, in the form of a spherical dome. The running part of the arm has an annular recess or indent 12 of axis Y—Y, of the same length as the needle bearings 4, forming a hollowed peripheral raceway for the said needles. This recess 12 is delimited by a cylindrical bottom 13 and by two end side walls 14. The outside wall 14 is spaced away from the groove 10 and closer to the axis X—X than the latter. Thus, a peripheral monolithic protrusion 15 separates the groove 10 from the recess 12 forming the raceway for the needle bearings 4.

The needle bearings 4 are engaged partly in the recess 12 and project radially with respect to the arm. They roll both on the bottom 13 of the recess 12 and in the bore 7 of the rollers. Consequently, in the absence of the collars 8, the rollers could escape by sliding towards the outside of the arms 3 which carry them.

In order to avoid this, and therefore to allow sure handling of the spider fitted with the needles and rollers, the collars 8 provide positive retention of the rollers on their arms before the spider is mounted in the female element of the joint, in the following manner.

The collar 8 shown on a larger scale in FIG. 2 is made of a springy plastic. It is annular and has a main portion 16 having a running outside diameter slightly less than the diameter of the bore 7 of the roller.

The collar 8 furthermore includes, on the inside, at one end, a peripheral excrescence on flange 17 engaged in the retaining groove 10 of the collar. This excrescence has a cross-section similar to that of the groove 10, thus ensuring that the ring is axially retained on the arm 3.

At its other end, the collar 8 has, on the outside, over at least most of its periphery, a rim 18 for retaining the roller. This rim 18 is axially offset with respect to the excrescence 17 towards the outside of the arm 3 on the main portion of the collar. It is placed vertically in line with a cylindrical surface 19 of the arm separating the groove 10 from the spherical dome of the cap 11. The main portion 16 of the collar bears internally on this cylindrical surface 19.

The rim 18 has, opposite the roller 5, a chamfered surface 20 designed to act cooperatively with a complementary chamfer 21 made at the end of the cylindrical bore 7 of the roller when this roller is at an end position of the arm 3. In this position, shown by the dotted lines in FIG. 2, the cylindrical bore 7 partly covers the main portion 16 of the collar and the rim 18 is essentially engaged in the space delimited by the chamfer 21 of the roller. Thus, the rim 18 does not constitute an obstacle to the free movement of the tripod in the female element of the joint. In particular, the radial length of the rim 18 is sufficiently limited so that it does not come into contact with the raceways made in the female element for the rollers.

In order to mount such an arrangement, the ring of needle bearings 4 and the roller 5 are firstly mounted followed, secondly, by the collar 8 which is fitted by being elastically deformed.

It will be understood that the collar 8 provides positive retention of the roller 5 by means of the rim 18. When the roller is in its extreme position shown by the dotted lines in FIG. 2, the force exerted by the roller on the collar 8 thus presses the outside surface of the main portion 16 against the cylindrical surface 19, thus limiting the deformation of the collar and, in particular, of the rim 18. Under these conditions, the latter is able to ensure retention of the roller.

Moreover, the force exerted by the roller on the rim 18, tending to extract the excrescence 17 from the groove 10, means that the outside cylindrical surface of the main portion 16 is applied against the surface of the cylindrical bore 7 of the roller. Thus, the excrescence 17 is held by means of the roller 5 inside the groove 10, preventing the collar 8 from being removed, despite its springiness.

FIG. 3 shows an alternative embodiment of the collar 8. In this embodiment, the main portion 16 of the collar is extended beyond the excrescence 17 vertically in line with the peripheral protrusion 15. Under these conditions, the excrescence 17 is placed in an intermediate part of the collar 8.

In this embodiment, it will be understood that the collar 8 bears not only on the cylindrical surface 19 but also on the peripheral protrusion 15 via the extension part of the main portion 16.

As a variant, the rim 18 is discontinuous. However, it does extend over most of the periphery of the collar.

In an alternative embodiment, not shown, the collar 8 consists of a split metal ring, having a cross-section which is substantially analogous to those shown in the figures. This split ring exhibits sufficient springiness to enable it to be fitted into the groove 10.

The spider described here has three arms. However, the invention relates to spiders however many arms they have. In particular, the spider may have only two arms or four arms, or even a greater number of arms.

In a spider according to the invention, it will be understood that the needle bearings 4 are isolated in a hollowed peripheral raceway and that the collar 8 forming the member for retaining the roller 5 is held away from the needle bearings 4. The needles bearings 4 therefore exert no stress on the collar 8 causing retraction of the collar 8. This is made possible since the needles 4 are retained only at each of their ends by the side walls 14.

Since the collar does not provide the needle-retention function, it is possible for it to be made of a springy material, enabling it to be retained in the groove 10 without having to use an additional fixing piece.

What is claimed is:

1. A spider for a universal joint, comprising:
   a main body having at least one arm projecting therefrom, said at least one arm including a hollowed raceway;
   a plurality of needle bearings located within said hollowed raceway;
   a roller rotatably and slidably supported by said plurality of needle bearings; and
   a collar positioned on said at least one arm to retain said roller on said needle bearings, said collar being positioned on said at least one arm such that said collar is spaced from said needle bearings.

2. The spider according to claim 1, wherein said collar includes a rim defining an outer diameter that is greater than an inner diameter of said roller, such that said rim is to retain said roller on said needle bearings.

3. The spider according to claim 2, and further comprising:
   at least one additional arm projecting from said main body, said at least one additional arm including a hollowed raceway;
   a plurality of needle bearings located within said raceway of said at least one additional arm;
   a roller rotatably and slidably supported by said plurality of needle bearings of said at least one additional arm; and
   a collar positioned on said at least one additional arm to retain said roller of said at least one additional arm on said needle bearings of said at least one additional arm, said collar of said at least one additional arm being positioned on said at least one additional arm such that said collar of said at least one additional arm is spaced from said needle bearings of said at least one additional arm.

4. The spider according to claim 3, wherein said collar of said at least one additional arm includes a rim defining an outer diameter that is greater than an inner diameter of said roller of said at least one additional arm, such that said rim of said collar of said at least one additional arm is to retain said roller of said at least one additional arm on said needle bearings of said at least one additional arm.

5. The spider according to claim 4, wherein said at least one arm and said at least one additional arm each further includes a groove, and wherein said collars of said at least one arm and said at least one additional arm are received within said grooves of said at least one arm and said at least one additional arm, respectively.

6. The spider according to claim 5, wherein each of said collars further includes a main body portion from which said rim extends outwardly from an upper surface thereof, said main body portion having an outer diameter that is less than said inner diameter of each of said rollers, respectively.

7. The spider assembly according to claim 6, wherein each of said collars further includes a flange extending from an inner surface of said main body portion and axially offset with respect to said rim, wherein said flanges are received within said grooves of said at least one arm and said at least one additional arm, respectively.

8. The spider assembly according to claim 7, wherein each of said collars further includes a secondary portion extending from said main body portion, and said flange is located between said rim and said secondary portion.

9. The spider assembly according to claim 8, wherein each of said collars is annular and comprises a resilient plastic material.

10. The spider assembly according to claim 8, wherein each of said collars comprises a resilient split metal ring.

11. The spider assembly according to claim 8, and further comprising a female element having tracks in which said rollers of said at least one arm and said at least one additional arm are receivable, respectively.

12. The spider assembly according to claim 4, wherein said rim of each of said collars includes a chamfered surface, and each of said rollers includes a correspondingly chamfered surface engageable with said chamfered surfaces of said rims, respectively.

13. The spider assembly according to claim 4, wherein said hollowed raceways of said at least one arm and said at least one additional arm, respectively, are defined by first and second monolithic protrusions of said at least one arm and said at least one additional arm, respectively, and said collars of said at least one arm and said at least one additional arm are spaced from said needle bearings of said at least one arm and said at least one additional arm by said first monolithic protrusions, respectively.

14. The spider assembly according to claim 2, wherein said at least one arm further includes a groove, and wherein said collar is received within said groove.

15. The spider assembly according to claim 14, wherein said collar further includes a main body portion from which said rim extends outwardly from an upper surface thereof, said main body portion having an outer diameter that is less than said inner diameter of said roller.

16. The spider assembly according to claim 15, wherein said collar further includes a flange extending from an inner surface of said main body portion and axially offset with regard to said rim, wherein said flange is received within said groove.

17. The spider assembly according to claim 16, wherein said collar further includes a secondary portion extending from said main body portion, and said flange is located between said secondary portion and said rim.

18. The spider assembly according to claim 17, wherein said collar is annular and comprises a resilient plastic material.

19. The spider assembly according to claim 17, wherein said collar comprises a resilient split metal ring.

20. The spider assembly according to claim 17, and further comprising a female element having a track in which said roller is receivable.

21. The spider assembly according to claim 2, wherein said rim includes a chamfered surface, and said roller includes a correspondingly chamfered surface engageable with said chamfered surface of said rim.

22. The spider assembly according to claim 2, wherein said hollowed raceway is defined by spaced first and second monolithic protrusions of said at least one arm, and said collar is spaced from said needle bearings by said first monolithic protrusion.

\* \* \* \* \*